(12) United States Patent
Hughes

(10) Patent No.: US 10,876,830 B2
(45) Date of Patent: Dec. 29, 2020

(54) NON-CONTACT SHEET MATERIAL THICKNESS MEASUREMENT SYSTEM

(71) Applicant: HONEYWELL INTERNATIONAL INC., Morris Plains, NJ (US)

(72) Inventor: Michael Kon Yew Hughes, Vancouver (CA)

(73) Assignee: Honeywell International Inc., Charlotte, NC (US)

( * ) Notice: Subject to any disclaimer, the term of this patent is extended or adjusted under 35 U.S.C. 154(b) by 32 days.

(21) Appl. No.: 16/298,666

(22) Filed: Mar. 11, 2019

(65) Prior Publication Data
US 2020/0292300 A1 Sep. 17, 2020

(51) Int. Cl.
*G01B 11/06* (2006.01)
(52) U.S. Cl.
CPC ................ *G01B 11/0691* (2013.01)
(58) Field of Classification Search
CPC ................................ G01B 11/0691
USPC ................................ 356/600–640
See application file for complete search history.

(56) References Cited

U.S. PATENT DOCUMENTS

| 4,160,204 A | 7/1979 | Holmgren |
| 6,281,679 B1 | 8/2001 | King et al. |
| 7,199,884 B2 | 4/2007 | Jasinski et al. |
| 9,441,961 B2 | 9/2016 | Haran et al. |
| 2013/0329037 A1* | 12/2013 | Shakespeare .......... B65H 26/00 348/88 |

\* cited by examiner

*Primary Examiner* — Tri T Ton

(57) ABSTRACT

A non-contact thickness measurement system includes a first optical displacement sensor in a first scanner head and a second optical displacement sensor in a second scanner head on opposite sides of a sheet material. The displacement sensors measure a plurality of distances to a first line in a first direction along the top of the material and plurality of distances to a second line in a second direction along a bottom of the material. An x,y position sensor determines x,y position data. A z-position sensor measures a sensor-to-sensor distance. A computing device determines a projected intersection point of the first and second lines, and using the projected intersection point selects a first distance from the distances from first displacement sensor and a second distance from the distances from the second displacement sensor, and for calculating a sheet material thickness using the first distance, second distance, and the sensor-to-sensor distance.

13 Claims, 4 Drawing Sheets

NON-CONTACT SHEET MATERIAL THICKNESS MEASUREMENT SYSTEM

FIELD

Disclosed embodiments relate to non-contact sheet material thickness measurement systems.

BACKGROUND

There is a variety of commercially available on-line sheet material thickness measurement systems also known as caliper sensors that can measure the thickness of a moving sheet material, such as paper during its manufacturing process. Such thickness sensors generally physically contact the sheet material on at least one side. The contacting method is subject to three fundamental types of problems. First, this method can be limited by the strength of the sheet material being measured. With fragile sheets such as tissue, for example, there is a tendency for the contacting 'shoes' to snag deviations or inclusions in the sheet surface, causing flaws in the sheet or even causing the sheet to tear. Second, the sheet itself can damage a contacting thickness sensor due either to abrasive wear on the contacting elements or due to physical damage arising from contact with sheet inclusions. For thickness sensors which traverse the sheet, damage can also be caused if a closed sensor goes to an on-sheet position from an off-sheet position. Third, the accuracy of contacting sensors can be adversely affected by the buildup of contaminants on the contacting elements, as may occur with coated or filled sheets or sheets containing recycled materials.

Some non-contact sheet material thickness measurement system are also known, such as an air-bearing, laser with dynamic colocation control (having opposing optical displacement sensors with one optical displacement sensor on a translation stage which moves one of the displacement devices so that the measurement position of both optical displacement sensors is at the same x,y position) and by the imaging of projected patterns. However, known non-contact sheet material thickness measurement systems generally do not provide thickness measurements to the desired measurement accuracy. The low measurement accuracy can limit can the use of non-contact sheet material thickness measurement systems to applications that allow low-accuracy thickness measurements to be used.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize the low measurement accuracy for known non-contact sheet material thickness (or 'caliper') measurement systems that comprise optical displacement sensors positioned on opposite sides of the sheet material results from poor control of the x,y position of the respective optical displacement sensor devices. This poor x,y position alignment control between the respective sensors results in the spots of light that they project onto the front and back of the sheet material not matching up, and there is also a difficulty with controlling the angle of the sheet material relative to the x,y plane.

Disclosed aspects solve the problem of low measurement accuracy for such non-contact sheet material thickness systems by using optical displacement sensors (e.g., triangulation sensors) that are each configured to emit along a line so that the lines along which the thickness of the sheet material is being measured by the respective optical displacement sensors are offset in the x,y plane relative to one another, with the lines typically angled by about 90° relative to one another. The thickness measurement is also performed at a sheet material position that provides essentially perfect x,y position alignment of the respective optical displacement sensors devices. With these above-described features disclosed non-contact sheet material thickness systems are capable of highly accurate on-line sheet material thickness measurements (also known as web thickness), even when the measurement is performed while the sheet material is moving.

One disclosed embodiment comprises a non-contact thickness measurement system for a sheet material that includes a first optical displacement sensor in a first scanner head on a first side of the sheet material (where the 'first' may be the top so that the first optical displacement sensor can be considered to be a top optical displacement sensor) and a second optical displacement sensor positioned in a second scanner head positioned on a second side of the sheet material (where the 'second' may be the bottom so that the second optical displacement sensor can be considered to be a bottom optical displacement sensor). The first optical displacement sensor measures a plurality of distances to a first line in a first direction along a top of the sheet material, and the second optical displacement sensor measures a plurality of distances to a second line in a second direction at an angle (typically about 90°) relative to the first direction along a bottom of the sheet material.

An x,y position sensor in at least one of the scanner heads is for determining x,y position data. A z-position sensor measures a sensor-to-sensor distance between the first and the second optical displacement sensors. A computing device including a processor having an associated memory is communicably coupled to receive and process the x,y position data from the x,y position sensor to determine a projected intersection point of the first line (say on top of the sheet material) and the second line (say on the bottom of the sheet material) being where the x position and y position coincide.

Because the respective scanned lines are on different sides (top and bottom) of the sheet material do not technically intersect, the term 'projected intersection point' shown as position (x,y) is used herein. The x sensor measures the X dimension displacement between the first optical displacement sensor and the second optical displacement sensor as x, and the y sensor measures the Y dimension displacement between the second optical displacement sensor and the first optical displacement sensor as y. Even if the x and y measurements are made by the same sensor, this definition of the measurements is used herein such that (x,y) always refers to the projected intersection point. The computing device using the projected intersection point selects a first distance ($d_1$) from the distances to the first line and selects a second distance ($d_2$) from the distances to the second line. The computing device is also for implementing an equation for calculating a thickness of the sheet material that utilizes the first distance, the second distance, and the sensor-to-sensor distance.

DETAILED DESCRIPTION

Figure 1:
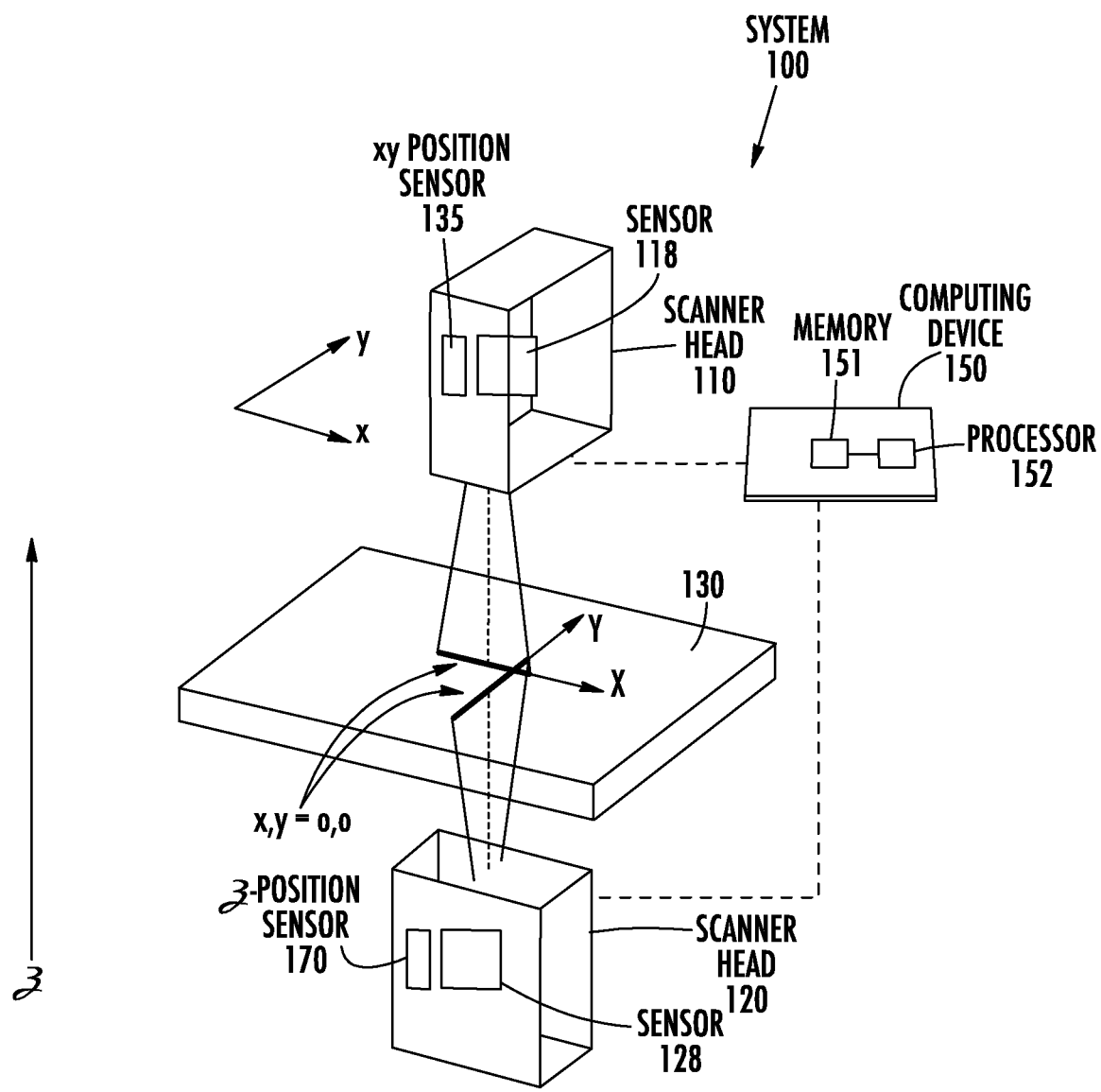
FIG. 1 depicts an example non-contact sheet material thickness measurement system that comprises a first optical displacement sensor and a second optical displacement sensor positioned on opposite sides of a sheet material each in a scanner head that are both oriented to emit light in the z-direction, each emitting along a line with the angle between the two lines of about 90 degrees, where the upper scan head and lower scan head are shown as being aligned, i.e., x,y=0,0, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

Optical displacement sensors are commercially available which not only measure the displacement (distance) to a single spot on a target surface by determining the position of the target surface through measuring light reflected from the target surface responsive to a light beam projected onto the target surface, but can also measure an array of displacements along a line. Measuring displacement along a line is typically called a profile measurement. As used herein an 'optical displacement sensor' includes optical displacement sensors that do not project a line per se, but instead rapidly scan a point along a line.

FIG. 1 depicts a disclosed non-contact sheet material thickness measurement system 100 that comprises a first optical displacement sensor 118 and a second optical displacement sensor 128 that each include a light source (e.g., a laser diode) and a photodetector array (e.g., a complementary metal-oxide semiconductor (CMOS) or charge-coupled device (CCD) detector array), such as each optical displacement sensor comprising a laser triangulation sensor. The optical displacement sensor 118, 128 are positioned on opposite sides of the sheet material 130 where the first scanner head 110 and the second scanner head 120 are shown as being perfectly aligned, i.e., their line's projected intersection point x,y=0,0.

The optical displacement sensors 118, 128 are within a first scanner head (or enclosure) 110 and a second scanner head 120, respectively that may be recessed from the emitting face of the scanner heads. The scanner heads 110, 120 are oriented so that the optical displacement sensors 118, 128 therein emit substantially in the z-direction and along lines usually at an angle of about 90 degrees to each other, such as being 85 to 95 degrees. The scanner heads 110, 120 generally both scan in the cross direction (CD) relative to the sheet material 130, where the sheet material 130 moves in the machine direction (MD) that is perpendicular to the CD.

The optical displacement sensors 118, 128 can be off-the-shelf triangulation-type sensors, such as those sold by Keyence (e.g., model LJ-V7020) or can be chromatic confocal devices such as those sold by Focalspec (e.g., model LCI 1200). The optical displacement sensors 118, 128 may also be off-the-shelf scanning type laser displacement sensors such as those sold by Keyence. The optical displacement sensors 118, 128 from the intensity, phase, location, wavelength or other characteristics of the measurement energy of light originating from their light source returning to their photodetector array, and/or the path length of light from their light source to their photodetector array or a reference location, determine values for the distances between the optical displacement sensor 118, 128 and a measured line on the sheet material 130.

An XY plane on the sheet material 130 is shown in FIG. 1, with a z-axis shown perpendicular to the XY plane, where X and Y are axes in the XY plane, where the XY plane is perpendicular to the projected beam axis of the optical displacement sensors 118, 128. In this arrangement where the lines are at an angle relative to another there is a point shown as x,y on the sheet material 130 where the respective lines measured by the displacement sensors 118, 128 have a projected intersection point. Therefore, this Disclosure recognizes as long as the relative scanner head 110, 120 motion is not too great the thickness of the sheet material 130 can be determined as long as it is known where the point x,y is.

Generally, X and Y are equivalent, and one can designate Y as being the MD and X as being the CD, where the scanner heads 110, 120 both move in the CD. Due to imperfections in the tracks and wheels (e.g., micro bends) of the scanner heads 110, 120 there are generally small but significant relative motions in both the X and Y-directions which is addressed by performing the sheet material thickness measurement at the projected line intersection point x,y.

The projected line intersection point x,y can be determined by the computing device 150 from the x,y position data received from the x,y position sensor 135 which is shown within the scanner head 110, where the x,y position sensor 135 generally comprises at least two components. However, the x,y position sensor 135 can be in either of the scanner heads 110, 120, or be in part in both of the scanner heads 110, 120. The x,y position sensor 135 can be in both scanner heads 110, 120 because in a typical arrangement although the measurement electronics for the x,y position sensor 135 may be in one scanner head, there may be a magnet placed in the other scanner head. The x,y position sensor 135 measures the absolute misalignment between the scanner heads 110, 120. The x,y position sensor 135 provides at least x- and y-coordinate measurements which are independent of one another that together generate the x,y position data values.

As noted above, the x and y sensors for the x,y position sensor 135 can be separate sensors that are mounted orthogonally relative to each other for measuring a magnetic field provided by a magnet or magnets placed in the opposing scanner head. In some cases there may also be a z-position sensor shown in FIG. 1 as a z-position sensor 170 in scanner head 120 that may also be magnet-based. There can be three z-position sensors placed at different positions in the scanner head 110, 120 to measure the scanner head tilt in two dimensions. The z-position sensor 170 can comprise eddy current sensors, Giant magnetoresistance (GMR) sensors or Hall-effect sensors, where the eddy current sensors are generally more accurate than the others. Although the z-position sensor 170 is shown in the scanner head 120, a portion of the z-position sensor 170 may be in both of the scanner heads 110, 120. For an inductive z-position sensor the electronics would be in one scanner head that would measure the z-position relative to a reference in the other scanner head.

One generally includes a z-position sensor 170 to measure the distance between the scanner heads 110, 120 (which may be referred to as being a 'sensor-to-sensor distance') because as the scanner heads 110, 120 are scanned (both generally scanning in the CD) so that the z-distance between the scanner heads 110, 120 and thus the optical displacement sensors 118, 128 will generally change, and it is generally necessary to know this z-distance between the scanner heads 110, 120 to approximately 1 µm. An example z-sensor that generally can be used to measure the total distance between the scanner heads 110, 120 to determine the sensor-to-sensor distance is described in U.S. Pat. No. 4,160,204.

The sheet material thickness measurement system 100 is shown including a computing device 150 having a processor 152 with an associated memory 151. The computing device 150 is configured to receive and process the x,y position data from the x,y position sensor 135 to determine a projected intersection point of the first line and the second line. The projected intersection point is used by the computing device 150 to select a first distance (e.g., $d_1$) from the plurality of distances to the first line and select a second distance (e.g., $d_2$) from the plurality of distances to the second line. The computing device 150 also implements an equation for calculating a thickness of the sheet material that utilizes the first distance, the second distance, and the sensor-to-sensor distance. The processor 152 can comprise a digital signal processor (DSP), a microcontroller, an application specific integrated circuit (ASIC), a general processor, or any other combination of one or more integrated processing devices. Although software/firmware is generally used to implement the equation for calculating the thickness of the sheet material, properly arranged hardware logic gates such as provided by a field-programmable gate array (FPGA) may also be used to implement the equation for calculating the thickness of the sheet material.

Disclosed non-contact thickness measurement systems are useful for accurately measuring the thickness (or caliper) of sheet materials such as paper as it is being manufactured. Because the thickness control of the sheet material 130 can generally only be effected fairly coarsely, on length scales >50 mm, the thickness measurements are usually binned in measurement bins of >5 mm. This mapping is performed in the CD direction. However, one generally does not need to make a correction to the position recorded by an encoder attached to the scanner heads 110, 120. So, if the scanner head's position encoder is reading that the scanner heads 110, 120 are at a distance from the edge of the sheet material 130 of 5,000 mm, for instance, and the x,y position sensor 135 is reading that the projected intersection measurement point x,y is at −1 mm from the scanner head 110, 120 center, one does not need correct the scanner head position to be 4,999 mm because the offset from the scanner head's center is substantially smaller as compared to the bin size of say 10 mm.

Figure 2:
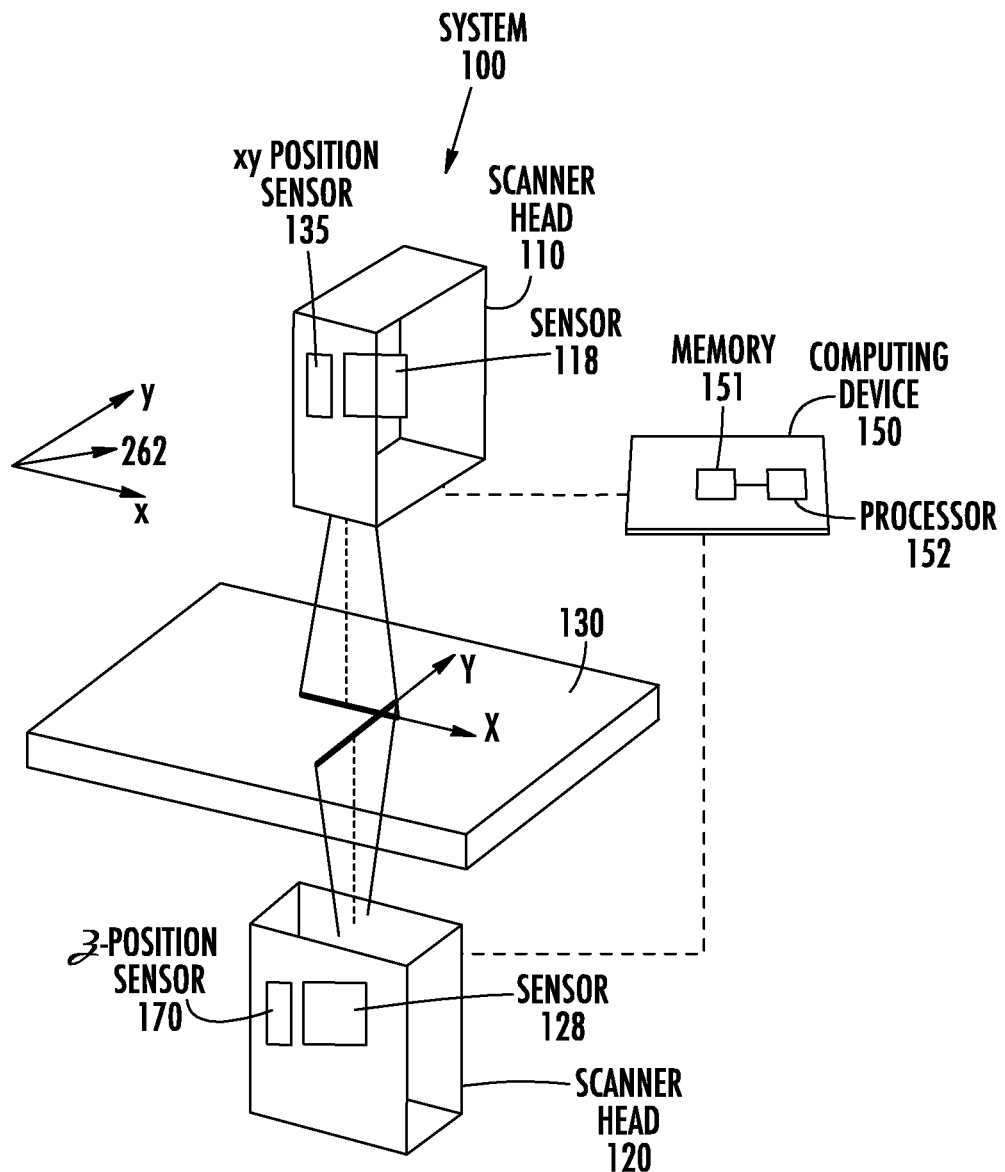
FIG. 2 depicts the example non-contact sheet material thickness measurement system shown in FIG. 1 where the upper scanner head and the lower scanner head are now shown as being misaligned, i.e., x,y does not=0,0, according to an example embodiment.

FIG. 2 depicts the example non-contact sheet material thickness measurement system 100 shown in FIG. 1 where the first scanner head 110 and the second scanner head 120 are now shown as being misaligned, i.e., x,y does not=0,0, according to an example embodiment. The heavier lines here show where the beams are projected, and therefore the line along which the distance measurements are made. The dashed lines show the center of each of these for reference. The arrow 262 shows the misalignment of the scanner heads 110, 120 which can be measured with a magnetic displacement sensor (the x,y position sensor 135) as x,y.

Each optical displacement sensor 118, 128 will provide an array of displacement measurements, say $d_1(X)$ for the first optical displacement sensor 118 and $d_2(Y)$ for the second displacement sensor 128. One can arbitrarily define X=0 and Y=0 when the displacement sensors 118, 128 are perfectly aligned. One can then identify the X and Y projected intersection position as X=x and Y=−y.

Figure 3:
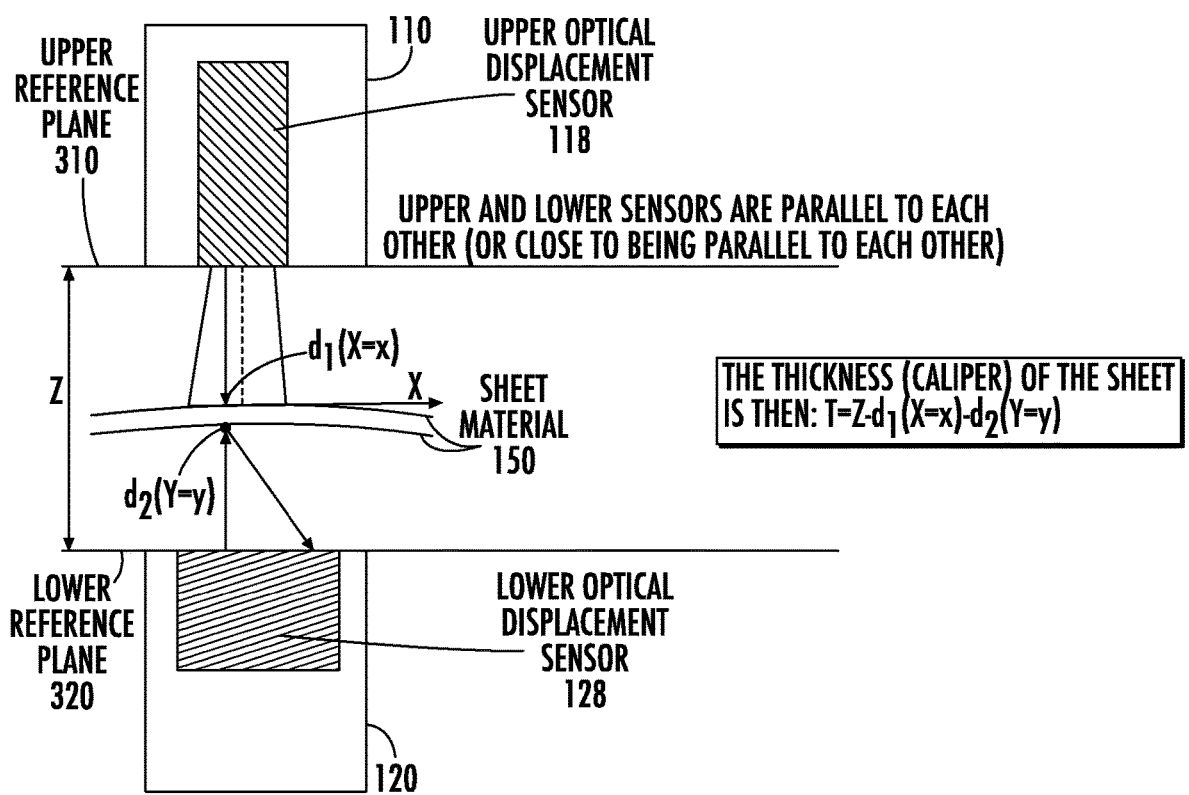
FIG. 3 is a front view of an example non-contact sheet material thickness measurement system showing the upper device reference plane associated with the first optical displacement sensor and the lower device reference plane associated with the second optical displacement sensor.

FIG. 3 is a front view of an example non-contact sheet material thickness measurement system showing the upper device reference plane 310 associated with the first optical displacement sensor in the first scanner head 110 and the lower device reference plane 320 associated with the second optical displacement sensor in the second scanner head 120. By virtue of their scanner heads 110, 120 the first optical displacement sensor 118 and the second optical displacement sensor 128 are parallel to one another, or are close to being parallel to one another. Each optical displacement sensor 118, 128 projects along a plane, where a side view of a plane is a line. The upper device reference plane 310 is the reference plane that the first optical displacement sensor 118 produces an array of distances from this plane. The lower device reference plane 320 is the reference plane that the second optical displacement sensor 128 produces an array of distances from this plane. The diagonal line shown regarding the second optical displacement sensor 128 represents light collected by its optics.

Figure 4:
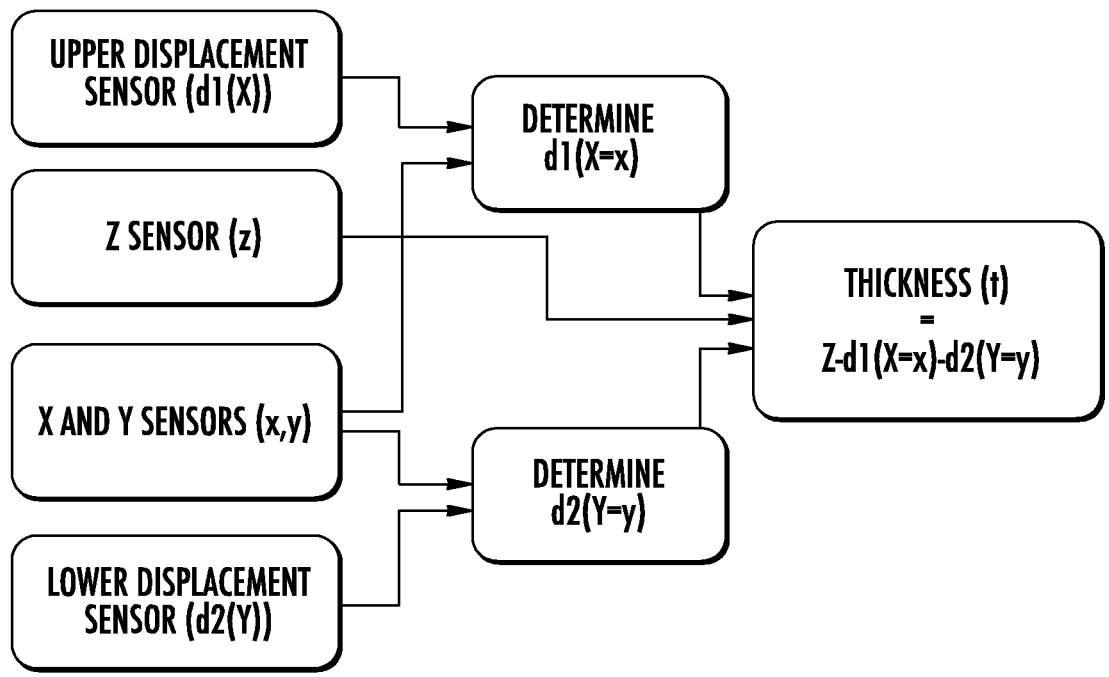
FIG. 4 shows steps in the disclosed calculation of sheet material thickness from input measurements, where x and y are the measurement outputs of an x,y sensor(s) which are adjusted so that they output the projected intersection point of the two optical displacement measurements enabling the thickness measurement of the sheet material to be performed at a sheet position that provides essentially perfect x,y alignment of the respective optical displacement sensors, according to an example aspect.

As shown in FIG. 3, the projected beam is shown fanning out from the first optical displacement sensor 118 shown as an upper optical displacement sensor. The second optical displacement sensor 128 shown as a lower optical displacement sensor is shown orthogonally positioned relative to the first optical displacement sensor 118 which is a typical arrangement, although not required because as described above generally any angle can be used to provide the projected intersection point x,y needed. For a triangulation laser, the illuminated line on the sheet material target is imaged, generally with a cylindrical lens, onto a photodetector array so that the distance of each position along the projected line can have its distance from its reference plane (310, 320) calculated, shown as $d_1(X=x)$ and $d_2(Y=y)$ in Equation 1 below. As noted above the thickness (or caliper; shown as t in Equation 1 below) of the sheet material 130 is then calculated as:

$$t = Z - d_1(X=x) - d_2(Y=y), \qquad \text{Equation 1}$$

where Z as shown in FIG. 4 and as used above is the sensor-to-sensor distance (in the z-direction thus being perpendicular to the x,y plane) which for non-recessed optical displacement sensors is the distance between the two scanner heads 110, 120. As described above, the sensor to-sensor distance can be measured with a z-position sensor 170 that can be either inductive or magnetic-based.

FIG. 4 depicts a disclosed calculation of sheet material thickness (caliper). It is first recognized the sensor to-sensor distance in the z-direction between the first scanner head 110 and the second scanner head 120 equals the sum of the respective distances from edge of the scanner heads 110, 120 when the optical displacement sensors 118, 128 are at the edge of the scanner heads 110, 120. This is expressed as the distance $d_1$ (the top z-distance) from the scanner head 110/optical displacement sensor 118 to the top of the sheet material 130 plus the distance $d_2$ (the bottom z-distance) from the scanner head 120/displacement sensors 128 to the bottom of the sheet material 130, plus the thickness (t) of the sheet material 130 which is desired to be accurately measured.

However, the optical displacement sensors 118, 128 are not necessarily at the sheet-facing emitting edge of the scanner heads 110, 120 as they may need to be kept at a stable temperature so the optical displacement sensors 118, 128 may be recessed a distance inside the scanner heads 110, 120, to be protected from the oftentimes harsh production environment. In this case since the mechanical dimensions of the optical displacement sensors 118, 128 are known, including the distance between the z-position sensor 170 and the optical displacement sensors 118, 128, this offset can simply be included into the individual distance measurements.

The calculation for the thickness (t) of the sheet material 130 at the projected intersection point of the two lines x,y when the displacement sensors 118, 128 are at the edge of the scanner heads 110, 120 can be implemented by the computing device 150 using Equation 1 where $d_1(X)$ is an array of linear displacements along the X dimension and $d_1(X=x)$ is the value at the projected intersection point where X=x. $d_2(Y)$ is an array of linear displacements measurements along the Y dimension, and $d_2(Y=y)$ is the value at the projected intersection point where Y=y. As noted above, x and y are the x,y position data measurements from the x,y position sensor(s) 135 which measures the absolute XY misalignment of the second displacement sensor 128 from the first displacement sensor 118.

Regarding measurement practicality, as the thickness measurement results are generally binned quite coarsely (e.g., >5 mm) with respect to the finest resolution possible, it is generally not necessary to precisely determine the exact measurement spot (x,y) with respect to the scanner bins although it is generally not difficult to do this. The relative scanner head motion in the CD is typically less than 1 mm which is much less than a typical CD bin size of 10 mm, so that CD bin reassignment based on the projected intersection point x,y is generally not necessary. Accordingly, one generally does not need to make a second order correction to map the relative X position onto the CD bins precisely.

Generally, the CD bin position is determined at the motor drive for the scanner heads 110, 120, where the scanner heads 110, 120 may be driven with belts. The first scanner head 110 and the second scanner heads 120 may have different belts which might not stretch the same as they drive the scanner heads 110, 120. This leads to the CD misalignment. One might be able to more precisely bin the thickness measurement with knowledge of the CD misalignment. However, this is generally a small correction.

Details, such as the scanner x and y measurement, and the sensor z-measurement are both well-known and are practiced with conventional optical thickness measurements. These elements are thus not described herein, but may be found U.S. Pat. No. 9,441,961 (the '961 patent') which is incorporated by reference herein. Similarly, methods are well known to align the optical displacement sensors 118, 128 with respect to each other and to obtain essentially zero offsets for the x, y position sensor 135.

Methods to correct for angular errors are also disclosed. Usually in two-sided optical thickness measurements for sheet materials (such as the sheet material 130 in FIGS. 1-3) the sheet material 130 is kept as-parallel-as-possible to the emitting faces of the scanner heads 110, 120 otherwise any x-y misalignment, coupled with a relative scanner head misalignment may lead to unacceptable thickness measurement errors. This requirement leads to the use of complicated air clamps to keep the sheet material 130 as flat as possible.

While this Disclosure removes most of that source of error, there is generally still a small error in the thickness measurement due an angular misalignment. This error is $t(1/\cos\theta - 1)$ where $\theta$ is the angle between the sheet material 130 and the emitting face of the scanner heads 110, 120 (assumed to be parallel) oriented in any direction in the x-y plane. This error can be calculated and removed by calculating the angle of the sheet material 130 at the projected intersection point x,y from the $d_1(X)$ and $d_2(Y)$ measurement arrays. One can use a variety of standard smoothing or fitting techniques to calculate this from the data arrays. The calculation to perform correction due to angular misalignment is disclosed in some patents, such as in the '961 patent.

Disclosed embodiments can be applied to generally to measure the thickness of any sheet material. For example, besides paper, various plastics, such as ones with $TiO_2$ inclusions for increased opacity, films with small cavitated voids to increase opacity, and for lithium-ion battery separator films.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of non-contact thickness measurement for a sheet material, comprising:

measuring a plurality of distances from a first optical displacement sensor in a first scanner head positioned above the sheet material to a first line in a first direction along a top of the sheet material, and measuring a plurality of distances from a second optical displacement sensor in a second scanner head positioned below the sheet material to a second line in a second direction that is at an angle relative to the first direction along a bottom of the sheet material;

determining a projected intersection point (x,y) of the first line and the second line;

determining at the projected intersection point a first distance from first optical displacement sensor to the top of the sheet material and a second distance from second optical displacement sensor to the bottom of the sheet material, and calculating a thickness of the sheet material from the first distance, the second distance, and a sensor-to-sensor distance between the first optical displacement sensor and the second optical displacement sensor, wherein the first optical displacement sensor is recessed relative to an emitting face of the first scanner head, wherein the second optical displacement sensor is recessed relative to an emitting face of the second scanner head, and wherein the calculating the thickness of the sheet material further comprising adding an offset term that reflects a distance the first optical displacement sensor is recessed and a distance the second optical displacement sensor is recessed.

2. The method of claim 1, wherein the optical displacement sensors both comprise a laser-based triangulation profile-measurement device including a light source and a photodetector array.

3. The method of claim 1, further comprising correcting the thickness of the sheet material using an angle of the sheet material relative to a face of the first and second scanner heads.

4. The method of claim 1, further comprising correcting the measurement of the projected intersection point for an angle of the first and second scanner heads with respect to one another.

5. The method of claim 1, wherein the sheet material comprises a moving sheet material and wherein the method is performed multiple times while the sheet material is being produced.

6. The method of claim 1, wherein the angle is 85 to 95 degrees.

7. The method of claim 1, wherein a z-position sensor is positioned in at least one of the first and second scanner heads that is used for the measuring of the sensor-to-sensor distance.

8. A non-contact thickness measurement system for a sheet material, comprising:

a first optical displacement sensor positioned in a first scanner head positioned on a first side of the sheet material and a second optical displacement sensor positioned in a second scanner head positioned on a second side of the sheet material opposite the first side, wherein the first optical displacement sensor is configured to measure a plurality of distances to a first line in a first direction along a top of the sheet material, and wherein the second optical displacement sensor is configured to measure a plurality of distances to a second line in a second direction at an angle to the first direction along a bottom of the sheet material;

an x,y position sensor in at least one of the scanner heads for determining x,y position data, a z-position sensor in at least one of the scanner heads for measuring a sensor-to-sensor distance between the first optical displacement sensor and the second optical displacement sensor, a computing device including a processor having an associated memory communicably coupled to receive and process the x,y position data to determine a projected intersection point of the first line and the second line, using the projected intersection point selecting a first distance ($d_1$) from the plurality of distances to the first line and a second distance ($d_2$) from the plurality of distances to the second line, and implementing an equation for calculating a thickness of the sheet material that utilizes the $d_1$, the $d_2$, and the sensor-to-sensor distance, wherein first optical displacement sensor is recessed relative to an emitting face of the first scanner head, wherein the second optical displacement sensor is recessed relative to an emitting face of the second scanner head, and wherein the calculating the thickness of the sheet material further comprising adding an offset term that reflects a distance the first optical displacement sensor is recessed and a distance the second optical displacement sensor is recessed.

9. The system of claim 8, wherein the first and the second optical displacement sensors both comprise a laser-based triangulation profile-measurement device including a light source and a photodetector array.

10. The system of claim 8, wherein the computing device is configured for implementing correcting the thickness of the sheet material using an angle of the sheet material relative to a face of the first and the second scanner heads.

11. The system of claim 8, wherein the computing device is configured for implementing correcting the measurement of the projected intersection point for an angle of the first and the second scanner heads with respect to one another.

12. The system of claim 8, wherein the angle is 85 to 95 degrees.

13. The system of claim 8, wherein the z-position sensor comprises an inductive or a magnetic sensor.

\* \* \* \* \*